(12) United States Patent
Zhang

(10) Patent No.: US 11,212,189 B2
(45) Date of Patent: Dec. 28, 2021

(54) OPERATION INFORMATION SYSTEM BASED ON PERVASIVE COMPUTING

(71) Applicant: Shanghai Data Center Science Co., Ltd, Shanghai (CN)

(72) Inventor: Jun Zhang, Shanghai (CN)

(73) Assignee: Shanghai Data Center Science Co., Ltd, Shanghai (CN)

( * ) Notice: Subject to any disclaimer, the term of this patent is extended or adjusted under 35 U.S.C. 154(b) by 0 days.

(21) Appl. No.: 16/965,569

(22) PCT Filed: May 28, 2019

(86) PCT No.: PCT/CN2019/088769
§ 371 (c)(1),
(2) Date: Jul. 28, 2020

(87) PCT Pub. No.: WO2020/228061
PCT Pub. Date: Nov. 19, 2020

(65) Prior Publication Data
US 2021/0168043 A1    Jun. 3, 2021

(30) Foreign Application Priority Data
May 16, 2019  (CN) .......................... 201910411384.9

(51) Int. Cl.
*H04L 12/24* (2006.01)
*H04L 29/08* (2006.01)
(Continued)

(52) U.S. Cl.
CPC .......... *H04L 41/147* (2013.01); *G06K 9/6288* (2013.01); *G06N 5/04* (2013.01);
(Continued)

(58) Field of Classification Search
CPC ........... H04L 12/24; H04L 29/08; G06N 5/04; G06K 9/62; G06F 9/54; G06F 17/30; G06Q 10/00
See application file for complete search history.

(56) References Cited

U.S. PATENT DOCUMENTS 10,177,998 B2 *  1/2019  Parandehgheibi .. G06F 16/2322
10,728,119 B2 *  7/2020  Parandehgheibi .. G06F 16/2365
(Continued)

FOREIGN PATENT DOCUMENTS

CN    107809493 A    3/2018
CN    108023961 A    5/2018
(Continued)

OTHER PUBLICATIONS

International Search Report dated Feb. 7, 2020, issued by the International Searching Authority (ISA/CN) in connection with International Application No. PCT/CN2019/088769 (4 pages).
(Continued)

*Primary Examiner* — Abdullahi E Salad
(74) *Attorney, Agent, or Firm* — McCarter & English, LLP

(57) ABSTRACT

Provided is an operation information system based on pervasive computing. An information node listener is responsible for listening to a distribution information node and an update of stored context information. A context retriever is responsible for indexing and retrieving the stored context information. An interpreter is configured to provide services for the information node listener and the context retriever. When the context information is retrieved and found out to be changed, a relevant body is configured for self-adaptive management. A fusion processing is performed on the information. A decision agent and an execution agent are configured to manage and control message transfer between agents and provide data for an effector. A network is (Continued)

configured to use a software-defined architecture to transfer data from a sensor platform to a server in a cloud.

2 Claims, 1 Drawing Sheet

(51) Int. Cl.
    *G06K 9/62*     (2006.01)
    *G06N 5/04*     (2006.01)

(52) U.S. Cl.
    CPC ........ *H04L 41/0816* (2013.01); *H04L 41/145* (2013.01); *H04L 67/12* (2013.01)

(56) References Cited

U.S. PATENT DOCUMENTS

| | | | | |
|---|---|---|---|---|
| 10,768,583 | B2* | 9/2020 | Fuji | G06N 3/006 |
| 2008/0027769 | A1* | 1/2008 | Eder | G06Q 40/12 |
| | | | | 705/7.28 |
| 2009/0171740 | A1* | 7/2009 | Eder | G06Q 40/12 |
| | | | | 705/7.12 |
| 2011/0106531 | A1* | 5/2011 | Liu | G06F 16/683 |
| | | | | 704/214 |
| 2012/0197772 | A1* | 8/2012 | Hing | G06Q 30/04 |
| | | | | 705/34 |
| 2013/0111189 | A1* | 5/2013 | Boehl | G06F 1/04 |
| | | | | 712/29 |
| 2013/0288656 | A1* | 10/2013 | Schultz | H04L 69/24 |
| | | | | 455/418 |
| 2014/0279904 | A1* | 9/2014 | Bai | G06F 16/1873 |
| | | | | 707/638 |
| 2019/0129723 | A1* | 5/2019 | Zhang | G06N 5/02 |

FOREIGN PATENT DOCUMENTS

| | | |
|---|---|---|
| CN | 108023962 A | 5/2018 |
| CN | 108038186 A | 5/2018 |

OTHER PUBLICATIONS

Chinese Office Action dated Feb. 7, 2021, issued in connection with Chinese Patent Application No. 201910411384.9, and English translation thereof (10 pages).

\* cited by examiner

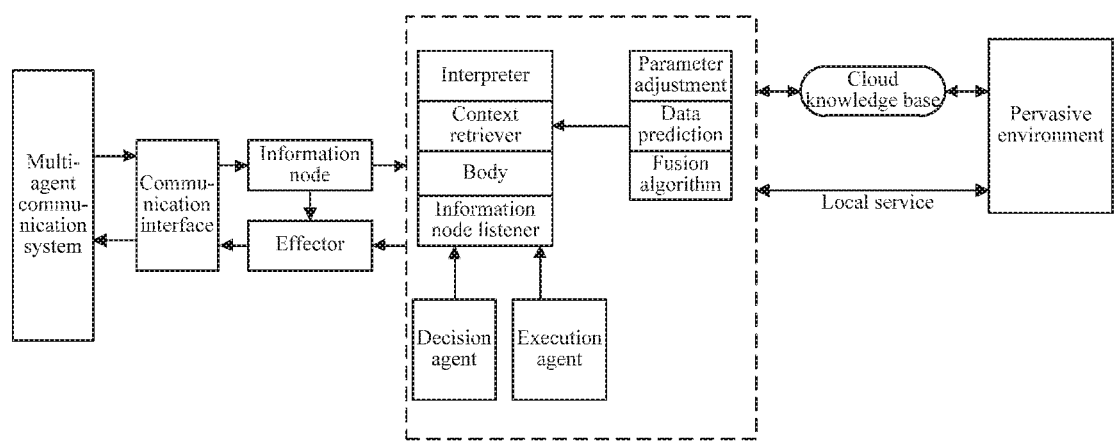

OPERATION INFORMATION SYSTEM BASED ON PERVASIVE COMPUTING

CROSS-REFERENCE TO RELATED APPLICATIONS

This is a National Stage Application, filed under 35 U.S.C. 371, of International Patent Application No. PCT/CN2019/088769, filed on May 28, 2019, which claims priority to Chinese patent application No. 201910411384.9 filed on May 16, 2019, contents of both of which are incorporated herein by reference in their entireties.

TECHNICAL FIELD

The present disclosure relates to the field of cloud computing technology and, in particular, to an operation information system based on pervasive computing.

BACKGROUND

Currently, pervasive computing refers to ubiquitous computing. Context-aware computing has become a core research topic in pervasive computing projects. Context is information that can be used for describing the condition of an entity. The entity may be a person, a place, or an object considered to interact with a user and an application, including the user and the application itself. If whether a system is context-aware depends on whether it provides relevant information and services for the user according to the context information, the relevance depends on tasks of the user. As regards most of the existing operation and maintenance environments, operation and maintenance is performed by using multiple agents, a multi-agent communication system is constructed, information is collected through multiple agents, and a high-level deduction is performed through context awareness.

Therefore, it should be implemented that the multi-agent operation and maintenance environment adapts to a pervasive computing environment.

SUMMARY

In view of this, the present disclosure provides an operation information system based on pervasive computing. An information node listener is responsible for listening to a distribution information node and an update of stored context information. A context retriever is responsible for indexing and retrieving the stored context information. An interpreter is used for providing services for the information node listener and the context retriever. When the context is retrieved and found out to be changed, a relevant body is configured for self-adaptive management, a fusion processing is performed on the information according to a parameter adjustment and a data prediction model, and a high-level context is deduced by a controller according to the relevant body in a cloud knowledge base. A decision agent and an execution agent are configured to manage and control message transfer between agents and providing data for an effector. A network is configured to use a software-defined architecture to transfer data from a sensor platform to a server in a cloud. A multi-agent communication system is applied to a pervasive environment so that the operation information system based on the pervasive computing is constructed.

The present disclosure provides the technical scheme below.

An operation information system based on pervasive computing is provided, the system includes the followings:
 a multi-agent communication system, which is configured to send a change in an operation and maintenance environment to an information node through a communication interface;
 the information node, which is configured to send received information about the operation and maintenance environment to a controller and an effector;
 an information node listener in the controller which is configured to listen to, through an interpreter, a distribution information node and an update of context information stored in an operation and maintenance knowledge base;
 a context retriever in the controller, which is configured to index and retrieve the stored context information through the interpreter;
 when the context information is retrieved and found out to be changed, a relevant operation and maintenance body, which is configured for self-adaptive management;
 where the controller is configured to adjust a parameter, set a data prediction model, perform, according to the parameter and the data prediction model and by use of a fusion algorithm, a fusion processing on the retrieved context information to obtain fused information; and deduce a high-level context according to the fused information and a relevant body in a cloud knowledge base, where the cloud knowledge base communicates with a pervasive environment;
 a decision agent and an execution agent, which are configured to manage and control message transfer between agents;
 a network, which is configured to use a software-defined architecture to transfer data from a sensor platform to a server in a cloud; and
 the effector, which is configured to transfer the data to the multi-agent communication system through the communication interface. Thus, it is implemented that the multi-agent communication system is applied to the pervasive environment.

In an embodiment, kernel support is obtained and an application interface is opened to construct the operation information system based on the pervasive computing.

According to the above technical scheme, compared with the related art, the present disclosure provides the operation information system based on the pervasive computing. The information node obtains information through the multi-agent communication system and sends the information to the effector and the information node listener. The information node listener listens to collected information of the information node and an update of stored context information. The context retriever indexes and retrieves the context information through the interpreter. The fusion processing is performed on the retrieved context information according to a parameter adjustment and a set data prediction model and by use of a fusion algorithm. The high-level context is deduced according to the relevant body in the cloud knowledge base, and the message transfer is performed between the agents and the pervasive environment. The decision agent and the execution agent are configured to manage and control the message transfer between agents. Finally, the transferred message is applied to the multi-agent communication system through the effector, so that the operation information system based on the pervasive computing is constructed.

BRIEF DESCRIPTION OF DRAWINGS

FIG. 1 is a schematic diagram of an operation information system based on pervasive computing according to the present disclosure.

DETAILED DESCRIPTION

The technical scheme of the present disclosure will be clearly and fully described hereinafter in conjunction with the drawing of the embodiment of the present disclosure. Apparently, the described embodiment is only part, not all, of the embodiments of the present disclosure.

The embodiment of the present disclosure provides an operation information system based on pervasive computing, the system includes the followings:
- a multi-agent communication system, which is configured to send a change in an operation and maintenance environment to an information node through a communication interface;
- the information node, which is configured to send received information about the operation and maintenance environment to a controller and an effector;
- an information node listener in the controller, which is configured to listen to, through an interpreter, a distribution information node and an update of context information stored in an operation and maintenance knowledge base;
- a context retriever in the controller, which is configured to index and retrieve the stored context information through the interpreter;
- when the context information is retrieved and found out to be changed, a relevant operation and maintenance body, which is configured for self-adaptive management;
  - wherein the controller is configured to adjust a parameter, set a data prediction model, perform, according to the parameter and the data prediction model and by use of a fusion algorithm, a fusion processing on the retrieved context information to obtain fused information; and deduce a high-level context according to the fused information and a relevant body in a cloud knowledge base, where the cloud knowledge base communicates with a pervasive environment;
- a decision agent and an execution agent, which are configured to manage and control message transfer between agents;
- a network, which is configured to use a software-defined architecture to transfer data from a sensor platform to a server in a cloud; and
- the effector, which is configured to be provided with the data and transfer the data to the multi-agent communication system. Thus, it is implemented that the multi-agent communication system is applied to the pervasive environment.

In an embodiment, kernel support is obtained and an application interface is opened to construct the operation information system based on the pervasive computing.

In the pervasive computing environment, the system needs to sense the dynamically changing context information and take corresponding actions. Therefore, to satisfy these requirements, sensing and application development need to be separated, in other words, processing of sensed data at a lower layer and a context-aware application at a higher layer need to be separated. Context awareness introduces a hierarchical structure to avoid awareness details at the lower layer and provides necessary context awareness services for the application.

The concept of the knowledge base comes from two different fields. One is artificial intelligence field and its branch, knowledge engineering field, and the other is traditional database field. The organic combination of the two computer technologies, the artificial intelligence and the database, promotes the generation and the development of a knowledge base system. However, lack of intelligent means, passive adaptation, a low efficiency, and a large amount of computing bring pressure to the control.

The body is a unanimous recognition of sharable concepts, giving the same understanding to expression and actual semantic connotation. These concepts include a variety of concept frameworks that may be used for modeling of the knowledge of different application fields and may be used for appointing the communication rules related to the application.

The multi-agent system belongs to the research field of distributed artificial intelligence in the subject of artificial intelligence. The multi-agent system is a system composed of multiple agents which can interact with each other and has typical complex system characteristics such as distribution, cooperation and parallelism. The multi-agent technology discusses that a group of autonomous agents are integrated to complete a complex system control and task solving process through actions such as interaction, cooperation, competition and negotiation in a dynamic open environment.

Each agent has a clear object. Each agent senses the respective internal state of the each agent and the environment information in the respective environment where the each agent is located, and communicates with other agents to improve the respective deduction capability and control capability and solve the problem. The multi-agent system can reduce the limitation of centralized control, planning and sequential control, provide functions such as decentralized control, emergency and parallel processing, reduce the consumption of software or hardware, and provide more convenient problem solving.

In the multi-agent system, agents make decisions and take actions by coordinating their knowledge, objects, skills and plans. In the multi-agent information fusion system, agents can have expert knowledge of different fields and different decision functions, and can observe different time and space, different aspects and different characteristics in an environment.

The middleware is a type of software that enables cross-network collaboration to be implemented between application components in the application layer. In this case, the "system structure, operating system, communication protocol, database and other application services" involved in application components are allowed to be different.

The operating principle of software definition is conceptually simple. A software-defined network (SDN) includes an SDN device, a controller and an SDN application. The SDN device includes a forwarding function that is used for determining how to process each incoming packet. The SDN controller is responsible for abstracting the network of the SDN device controlled by the SDN controller and providing the abstractions of these network resources for the SDN application running on the controller. OpenFlow is a communication means between the controller and the network device.

What is claimed is:

1. An operation information system based on pervasive computing, comprising:

a multi-agent system, which comprises multiple intelligent agents and is configured to send information about a change in an operation and maintenance environment to an information node through a communication interface, to enable the information node to send the information about the change in the operation and maintenance environment to a hardware controller and an effector, wherein the multiple intelligent agents comprise sensors and actuators; and the hardware controller, which is configured to perform:

receiving the information about the change in the operation and maintenance environment sent by the information node;

listening to a distribution information node and an update of context information stored in an operation and maintenance knowledge base;

indexing and retrieving the stored context information;

in a case where the context information is retrieved and found out to be changed, configuring a relevant operation and maintenance body for self-adaptive management;

adjusting a parameter, setting a data prediction model, performing, according to the parameter and the data prediction model and by use of a fusion algorithm, a fusion processing on the retrieved context information to obtain fused information; and deducing a high-level context according to the fused information and a relevant body in a cloud knowledge base, wherein the cloud knowledge base communicates with a pervasive environment; and managing and controlling message transfer between the intelligent agents, and transferring a message to the multi-agent system through the effector.

2. The operation information system based on pervasive computing of claim 1, wherein kernel support is obtained and an application interface is opened to construct the operation information system based on the pervasive computing.

* * * * *